United States Patent
Vuong

(10) Patent No.: US 6,765,912 B1
(45) Date of Patent: Jul. 20, 2004

(54) NETWORK RESOURCE USAGE IN CALL SESSIONS

(75) Inventor: Thai H. Vuong, Garland, TX (US)

(73) Assignee: Nortel Networks Limited, St. Laurent (CA)

( * ) Notice: Subject to any disclaimer, the term of this patent is extended or adjusted under 35 U.S.C. 154(b) by 770 days.

(21) Appl. No.: 09/634,101

(22) Filed: Aug. 8, 2000

(51) Int. Cl.[7] .............................. H04L 12/56; H04J 3/12
(52) U.S. Cl. .................... 370/395.2; 370/352; 370/410; 370/522; 379/221.08; 379/230
(58) Field of Search ................................ 370/352, 353, 370/401, 410, 395.2, 522, 524; 379/221.08, 220.01, 230

(56) References Cited

U.S. PATENT DOCUMENTS

| | | | | |
|---|---|---|---|---|
| 5,956,334 A | * | 9/1999 | Chu et al. ................. | 370/395.2 |
| 6,026,086 A | * | 2/2000 | Lancelot et al. ............ | 370/353 |
| 6,157,636 A | * | 12/2000 | Voit et al. ................... | 370/353 |
| 6,353,610 B1 | * | 3/2002 | Bhattacharya et al. ...... | 370/352 |
| 6,389,130 B1 | * | 5/2002 | Shenoda et al. ....... | 379/221.08 |
| 6,529,514 B2 | * | 3/2003 | Christie et al. ............. | 370/401 |
| 6,633,637 B1 | * | 10/2003 | Garland et al. ............. | 379/230 |
| 6,636,508 B1 | * | 10/2003 | Li et al. ...................... | 370/389 |
| 6,636,596 B1 | * | 10/2003 | Gallant et al. ......... | 379/220.01 |
| 6,640,318 B1 | * | 10/2003 | Qiu et al. ..................... | 714/43 |
| 6,658,022 B1 | * | 12/2003 | West et al. ................. | 370/467 |
| 6,671,367 B1 | * | 12/2003 | Graf et al. .................. | 379/229 |
| 6,704,405 B1 | * | 3/2004 | Farris et al. ........... | 379/215.01 |
| 2001/0053154 A1 | * | 12/2001 | Christie et al. ............. | 370/466 |
| 2003/0219103 A1 | * | 11/2003 | Rao et al. ................ | 379/32.05 |

OTHER PUBLICATIONS

Recommendation Q.1901, *Bearer Independent Call Control Protocol*, pp. 1–71 (Sep. 1999).
Bates, Regis J. et al. "Voice and Data Communications Handbook," Third Edition, McGraw Hill, pp. 273–276, 631–643, 705–748.
Performance Technologies, Inc., "SS7 Tutorial,", pp. 1–6, dated at least as early as Jul. 6, 2000, printed from web site http://www.microlegend.com.
Fernando Cuervo et al., "Megaco Protocol," Internet Draft, pp. 1–151 (Apr. 2000), printed from web site http://www.ietf.org.

\* cited by examiner

Primary Examiner—Seema S. Rao
Assistant Examiner—Michael J. Moore, Jr.
(74) Attorney, Agent, or Firm—Trop, Pruner & Hu, P.C.

(57) ABSTRACT

A communications system includes a first network of a first type and a second network of a second type. One example of the first network is a circuit-switched network that employs a time-division multiplexing (TDM) scheme. An example of the second network is a packet-based network such as an Asynchronous Transfer Mode (ATM) network or an Internet Protocol (IP) network. A call request originated in the first network is received by a gateway system coupled between the first network and the second network. A call is then established over the second network. A success indication of the call over the second network is waited for before establishing a bearer traffic connection between the first network and the second network.

42 Claims, 5 Drawing Sheets

NETWORK RESOURCE USAGE IN CALL SESSIONS

TECHNICAL FIELD

The invention relates generally to improving efficiency of network resource usage in call sessions.

BACKGROUND

Various different types of communications networks enable call sessions between end points, such as telephones, computer systems fitted with voice processing capabilities, and other devices. Generally, two types of networks exist: circuit-switched networks and packet-based networks. In a circuit-switched network, a dedicated, end-to-end circuit connection is established for the duration of each call. This works well for communications that are generally continuous, such as speech between two end users.

Packet-based networks, on the other hand, communicate by use of packets sent in a series of bursts. The packets are generally communicated when needed, without an explicit connection defined between the two end points. Instead, routing is based on addresses carried in the packets. Examples of packet-based networks include Internet Protocol (IP) networks, which employ connectionless internetwork layers. In a connectionless packet-based network, packets or other units of data are injected into the network, which packets travel independently over any path (and possibly over different paths) to a destination point. The packets may even arrive out of order. Another type of packet-based data network is a connection-oriented network, such as an Asynchronous Transfer Mode (ATM) network or Frame Relay network. In a connection-oriented packet-based network, a virtual circuit or connection is established between two end points, and packets are received in the same order in which they were transmitted.

Protocols employed in circuit-switched networks for communications include the Integrated Services Digital Network (ISDN), which is a network service that provides end-to-end digital connectivity to support a wide range of services, including voice and non-voice services. Another type of circuit-switched network is the T-carrier network, such as the T-1 or T-3 network. A T-1 network is a digital network capable of carrying 24 channels multiplexed to create an aggregate bandwidth of 1.536 megabits per second (Mbps).

In many of the digital circuit-switched networks, time-division multiplexing (TDM) is used to merge multiple data streams onto different time slots of a circuit. Using TDM, each terminal is assigned a time slot (or plural time slots) for communications over a circuit. When a call over a TDM circuit is initiated, a time slot is reserved to dedicate the time slot for the voice channel. Once reserved, the TDM time slot remains idle if unused by the requesting device.

With the availability of various different types of communications networks, interworking is performed to enable communications between the different types of networks. Thus, for example, a media gateway may be provided between a circuit-switched network and a packet-based network. A call may be originated from a terminal connected to a circuit-switched network with the destination being a terminal connected to another circuit-switched network, and with the two circuit-switched networks connected by a packet-based network. The call is translated in the gateways between circuit-switched and packet-based formats. Typically, on both the circuit-switched and packet-based networks, the gateways perform the necessary exchanges of messaging to establish call sessions on the respective circuit-switched and packet-based networks. The necessary resources are reserved on both the circuit-switched and packet-based networks.

In contrast to circuit-switched networks such as TDM networks, a resource being reserved on a packet-based network does not necessarily mean it is consumed. An unused resource on a packet-based network, although reserved, remains available for use by other devices. However, once a gateway establishes a bearer traffic connection between the TDM side and the packet-based side, the reserved resources on the packet-based network are consumed even before the call is fully established since the idle time slots on the TDM network are communicated over the packet-based network. As a result, unnecessary consumption of packet-based network resources may occur.

A need thus exists for an improved method and apparatus of utilizing network resources in a call session.

SUMMARY

In general, according to one embodiment, a method of establishing a call session over a first network of a first type and a second network of a second type, the method comprising receiving a call request over the first network and establishing a call over the second network. The method waits for a success indication of the call over the second network before connecting the first network to the second network for the call session to delay consumption of a resource on the second network.

Some embodiments of the invention may have one or more of the following advantages. By waiting for a success indication of the call over the second network before connecting the first network to the second network, more efficient usage of resources on the second network can be achieved. For example, if the first network utilizes a time-division multiplexing (TDM) scheme, reserving a time slot makes that time slot unavailable for other network elements on the first network; instead, the time slot remains idle. If the first and second networks are connected too early, then resources on the second network are consumed by unnecessarily communicating the idle time slots of the first network onto the second network. By reducing resource consumption on the second network, such resources remain available for other communications sessions over the second network.

Other features and advantages will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible. For example, although reference is made to Asynchronous Transfer Mode (ATM) networks and time-division multiplex (TDM) networks in some embodiments described herein, further embodiments may include other protocols or standards for call sessions over either circuit-switched or packet-based networks.

Figure 1:
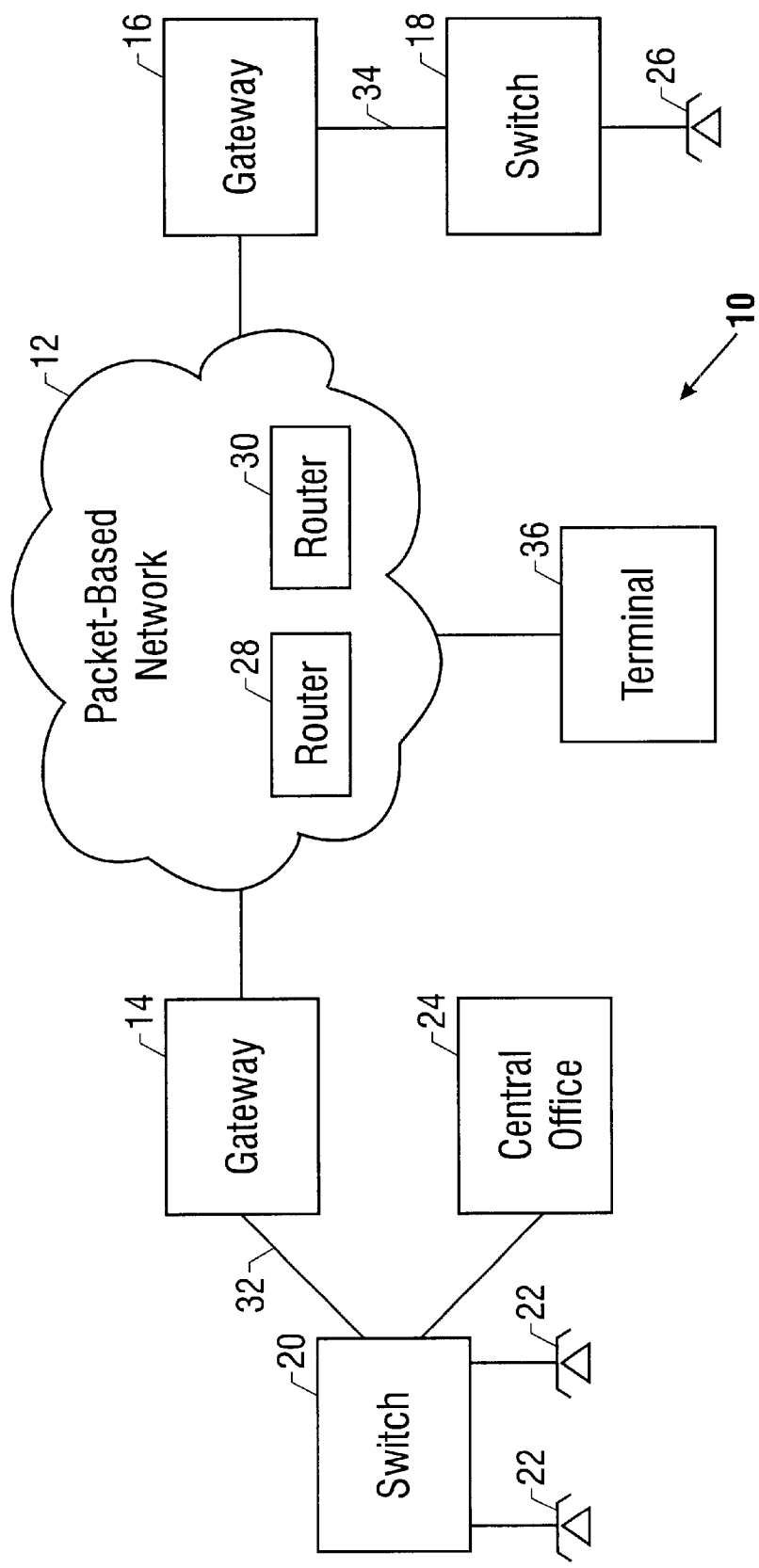
FIG. 1 is a block diagram of an embodiment of a communications system.

Referring to FIG. 1, a communications system 10 includes a packet-based network 12 that has one or more routers (28 and 30 illustrated). In one embodiment, the packet-based network 12 is an Asynchronous Transfer Mode (ATM) network. The ATM standard is established by the International Telegraph and Telephone Consultative Committee Communications (CCITT) Standards Organization. In an ATM network, packets or cells are used to communicate information. The transport of ATM packets does not occur periodically with respect to some fixed timing reference; instead, ATM packets arrive and are processed across the network randomly since there is no specific timing associated with ATM traffic.

ATM is a connection-oriented, packet-based network service. To ensure that packets arrive in the same order that they were transmitted, virtual circuits are established in an ATM network. A virtual circuit or path is a grouping of channels between network entities. Each packet exchanged between entities on an ATM network includes a virtual path identifier (VPI) and a virtual channel identifier (VCI) to identify the virtual channel on the virtual path. The combination of the virtual path and the virtual channel make up the data link between two network entities on an ATM network.

As an alternative to ATM networks, the packet-based network 12 can be a connectionless, packet-switched network, such as an Internet Protocol (IP) network. A version of IP is described in Request for Comments (RFC) 791, entitled "Internet Protocol," dated September 1981. Another version of IP is IPv6, as described in RFC 2460, entitled "Internet Protocol, Version 6 (IPv6) Specification," dated December 1998.

In a connectionless, packet-switched network, routing of packets is based on a source and destination address carried in each packet. The packets can travel independently over any path (and possibly over different paths) to a destination point identified by the destination address carried in the packets. The packets may even arrive out of order. Thus, whereas ATM is a connection-oriented, packet-based network, an IP network is a connectionless, packet-based network.

As used here, a "network" or "data network" may refer to one or more communications networks, channels, links, or paths and systems or devices (such as routers) used to route data over such networks, channels, links, or paths.

The communications system 10 includes gateway systems 14 and 16 (e.g., media gateways) connected to the packet-based network 12. The gateway systems 14 and 16 are interconnected to respective networks 32 and 34, which in one embodiment are circuit-switched networks. The gateway systems 14 and 16 thus provide for interworking between circuit-switched networks and the packet-based network 12. Examples of circuit-switched networks include Integrated Services Digital Networks (ISDN) and T-carrier (e.g., T-1, T-3, E-1) networks. Each of the circuit-switched networks 32 and 34 is connected to respective switch 20 and 18. Examples of the switches 18 and 20 include tandem switches or intermediate exchange switches. Each switch 18 or 20 can also be part of a central office, or alternatively, each switch can be connected to a central office, such as the switch 20 being connected to a central office 24 in the public switched telephone network (PSTN). The switches 18 and 20 are connected by lines to respective terminals, which can be telephones 26 and 22.

In one embodiment of the circuit-switched networks 32 and 34, a time-division multiplex (TDM) circuit-switching scheme is used to create a dedicated circuit between any two devices for the duration of the connection. TDM divides the bandwidth down into fixed time slots each with its own fixed capacity. Each attached device on the network is assigned a fixed portion of the bandwidth using one or more time slots.

Assignment of a device to a particular time slot is performed during call setup. In a call session that crosses through the gateway 14 or 16, exchanges of messaging to establish a call over the circuit-switched network 32 or 34 and a call over the packet-based network 12 are performed. The combination of the calls over the circuit-switched and packet-based networks make up the call session between two terminals. The terminals involved in a call session can be a first terminal coupled to the circuit-switched network 32 and a second terminal coupled to the circuit-switched network 34. In such a call session, call traffic crosses through both gateways 14 and 16 and the packet-based network 12. Another call session may involve a terminal coupled to the circuit-switched network 32 or 34 and a terminal coupled to the packet-based network 12, such as terminal 36. In this type of call session, the call traffic crosses through one of the gateways 14 and 16 and the packet-based network 12. Examples of the terminal 36 include telephones enabled to communicate over a packet-based network, a computer system having voice processing capabilities, and other types of voice/video-enabled devices.

As noted, one of the acts performed in call setup on the TDM circuit-switched network 32 or 34 is to reserve a time slot. In another embodiment using another type of circuit-switched network, other types of resources may be reserved. Once reserved, the time slot (or other resource) becomes unavailable for other network elements on the circuit-switched network 32 or 34. Thus, even if the requesting device is not using the reserved TDM time slot, that time slot remains idle.

Resources (such as bandwidth) can also be reserved on the packet-based network 12. Such reservation of resources is according to the quality of service (QoS) framework defined for the packet-based network 12. For example, ATM provides a QoS mechanism. Alternatively, resource reservation may be performed by use of the Resource Reservation Protocol (RSVP) or other resource reservation technique to provide some predetermined quality level for a call session over the packet-based network 12. RSVP is described in RFC 2205, dated September 1997. Unlike in a TDM network, reservation of a resource in the packet-based network 12 does not necessarily mean that resource is consumed and unavailable for other network entities on the packet-based network 12. In establishing a call session that traverses both a TDM circuit-switched network and the packet-based network 12, connecting the circuit-switched and packet-based sides for communicating bearer traffic through a gateway system 14 or 16 will cause resources on the packet-based network to be consumed, since the idle time slots (bearer traffic) on the circuit-switched network are communicated over the packet-based network. Thus, in accordance with embodiments of the invention, the gateway system 14 or 16 is configured to delay establishment of a bearer traffic connection of the circuit-switched and packet-based sides until some indication is received regarding the success of the call setup. In some embodiments, the success indication is in the form of an indication that the destination terminal has answered the call request. As used here, "bearer traffic" refers to the traffic communicated between two terminals, such as voice (or other audio), video, or other forms of streaming or real-time traffic. Bearer traffic is distinguished from control traffic or control signaling, which are used for call session setup, management, or tear down. A "bearer traffic connection" refers to connecting two networks to enable communicating bearer traffic between the two networks (not just control signaling).

By delaying the consumption of resources on the packet-based network, those resources can remain available for other communications sessions. The savings in bandwidth increases with the number of routers or switches (e.g., tandem switches) used for call setup that are present in the packet-based network.

In one embodiment, the signaling scheme used over the ATM network 12 is the Bearer Independent Call Control (BICC) protocol, which is an adaptation of narrow band ISDN user part (ISUP) for the support of narrow band ISDN services. BICC provides call control signaling that is independent of the bearer technology and signaling transport technology used. BICC is defined by Recommendation Q.1901 from the International Telecommunication Union (ITU). The ISDN user part (ISUP) is part of the Signaling System #7 (SS7) protocol stack and defines the protocol and procedure used to set up, manage, and release trunk circuits that carry voice and data over a circuit-switched network, such as the circuit-switched network 32 or 34. SS7 utilizes out-of-band signaling to establish, manage, and release calls. Out-of-band signaling does not take place in the same path as the bearer traffic (e.g., voice traffic).

Figure 2:
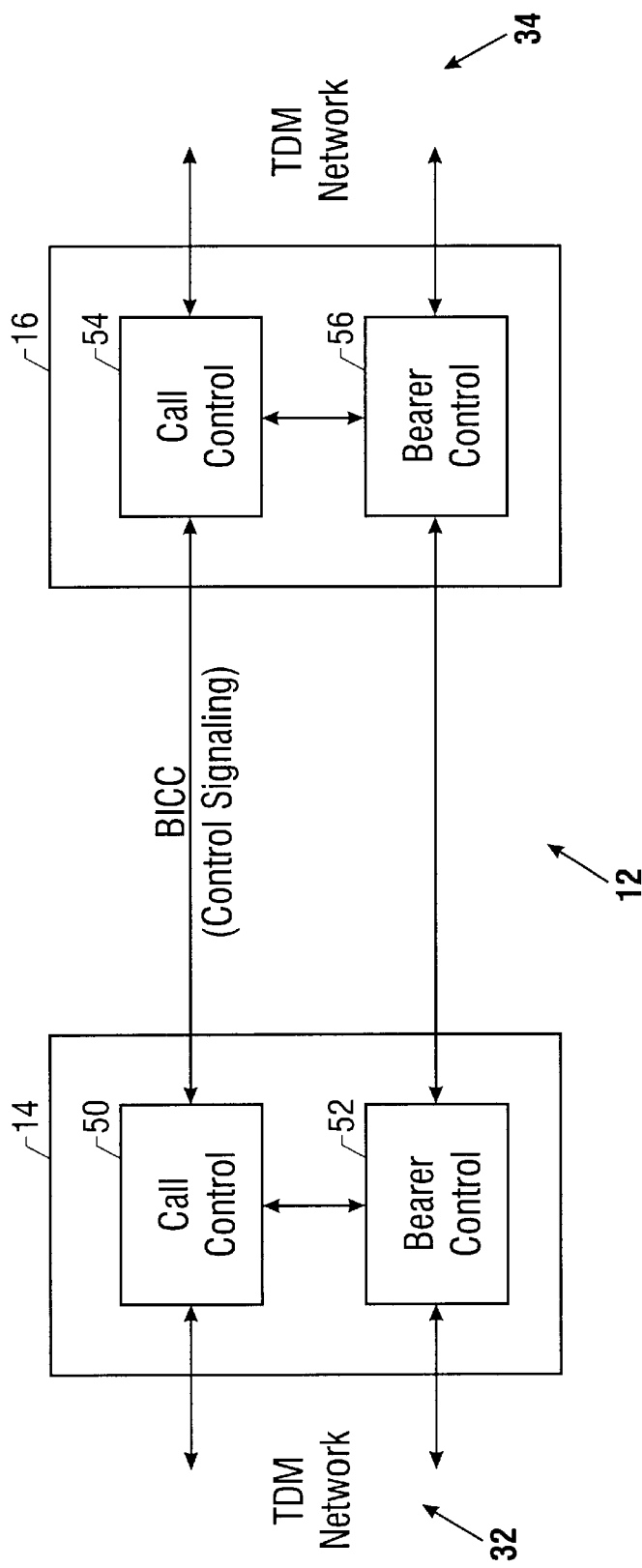
FIG. 2 is a block diagram of components of the communications system of FIG. 1.

Generally, as illustrated in FIG. 2, BICC signaling is exchanged between call control elements 50 and 54 in respective gateway systems 14 and 16. The BICC signaling is exchanged between the gateway systems 14 and 16 to establish, manage, and tear down calls over the packet-based network 12. Once a call is established, user or bearer traffic is exchanged between bearer control elements 52 and 56 in respective gateway systems 14 and 16. The call control and bearer control elements 50, 54, and 52, 56 also perform communications of call control and bearer signaling over respective TDM circuit-switched networks 32 and 34.

Figure 3:
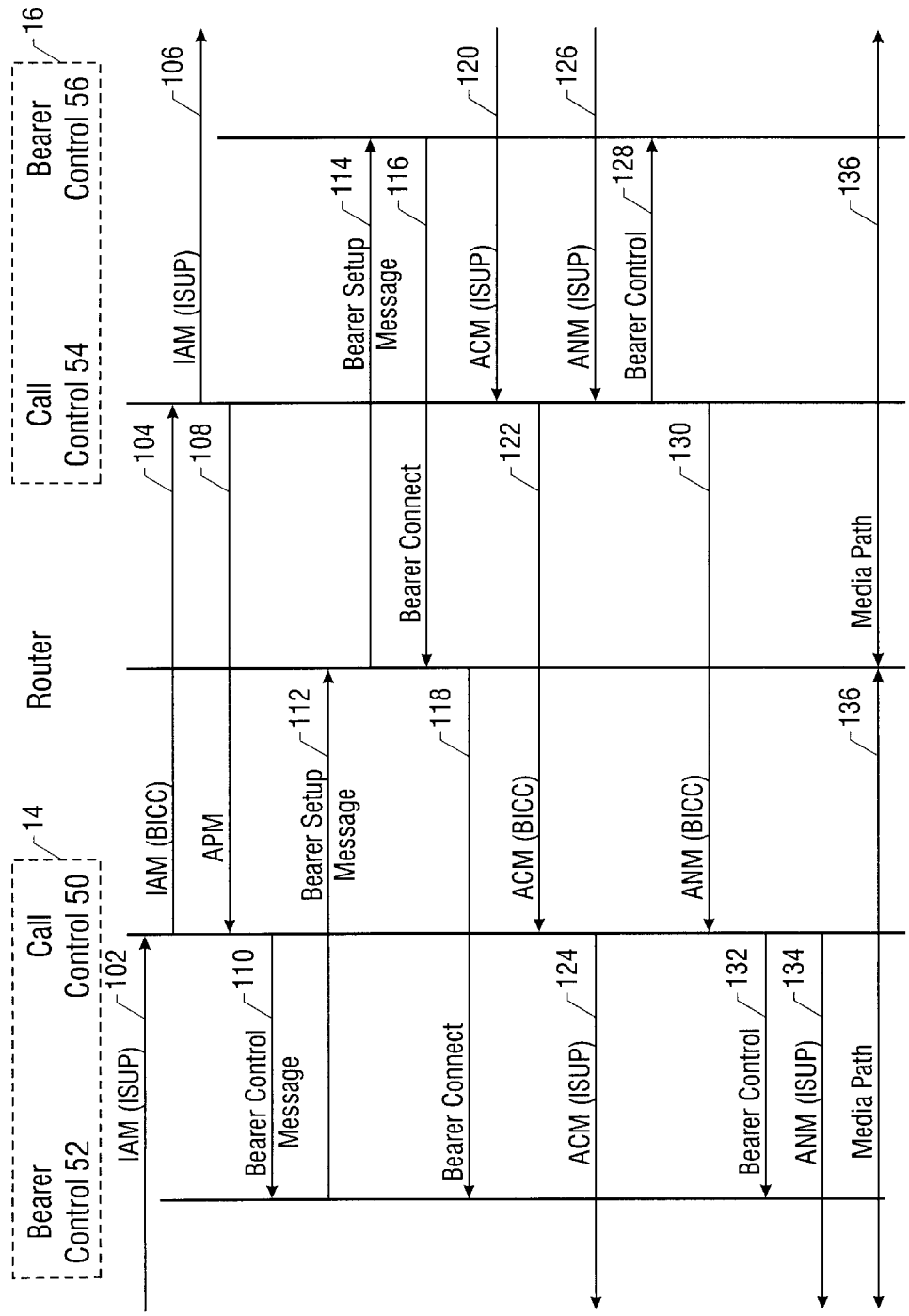
FIG. 3 is a message flow diagram of signaling for establishing a call session that involves a first gateway and a second gateway coupled by a packet-based network, the signaling including Bearer Independent Call Control (BICC) messaging and signaling over circuit-switched networks.

Referring to FIG. 3, a message flow diagram illustrates exchanges of messaging among the call control elements 50, 54 and bearer control elements 52, 56 of respective gateway systems 14, 16 and a router within the packet-based network 12. Although one router is illustrated in the message flow diagram of FIG. 3, further embodiments may have additional one or more routers in the packet-based network.

In the message flow diagram of FIG. 3, it is assumed that a terminal on the circuit-switched network 32 initiates a call with a terminal connected to the circuit-switched network 34. Access between the circuit-switched networks 32 and 34 is provided over the packet-based network 12 and gateways 14 and 16. Another example call may involve a terminal connected to one of the circuit-switched networks 32 and 34 and a terminal connected to the packet-based network 12.

The call control element 50 in the gateway system 14 (originating gateway system) receives an ISUP initial address message (IAM) (at 102) communicated over the network 32 to reserve an idle trunk circuit from the originating switch (20) to the destination switch (18). The IAM includes the originating point code, destination point code, circuit identification code, dialed digits, and other information. In response, the call control element 50 generates and sends (at 104) a BICC IAM message to the destination gateway system 16. The call control element 54 in the destination gateway system 16 processes the BICC IAM message, and in response to contents of the BICC IAM message, generates an ISUP IAM message (at 106) that is targeted to the destination switch, in this case, switch 18. The ISUP IAM message communicated at 106 is communicated over the TDM circuit-switched network 34.

The call control element 54 in the destination gateway system 16 then sends (at 108) an application transport mechanism (APM) message back to the call control element 50 in the gateway system 14 to indicate that call setup is proceeding from the destination gateway system 16 to the destination switch 18. Upon receipt of the APM message, the call control element 50 in the gateway system 14 sends a bearer control message (at 110) to the bearer control element 52 to establish a bearer channel. In response, the bearer control element 52 in the gateway system 14 sends a bearer setup message (at 112) to the router in the ATM network 12. If plural routers are in the ATM network 12, the bearer setup message is forwarded to each of the routers to establish the bearer channel. The router forwards the bearer setup message (at 114) to the bearer control element 56 in the destination gateway system 16. In response, the bearer control element 56 in the destination gateway system 16 returns a bearer connect message (at 116) back to the router, which forwards the bearer connect message (at 118) back to the bearer control element 52 of the originating gateway system 14. At this point, a bearer channel has been established over the ATM network 12 between the gateway systems 14 and 16. However, consumption of bandwidth on the ATM network 12 has not occurred yet since the gateway systems have not connected the ATM side to respective TDM sides. This avoids communication of idle time slots of the TDM networks over the ATM network 12, which consumes bandwidth.

Upon receiving the ISUP IAM message communicated at 106, the destination switch 18 examines the dialed number carried in the IAM message and determines if the destination switch 18 serves the called party and if that line is available for ringing. If so, the destination switch 18 rings the called party line and transmits an ISUP address complete message (ACM) (at 120) to the call control element 54 in the destination gateway system 16. The ACM message indicates that the remote end of the trunk circuit has been reserved. Upon receipt of the ISUP ACM message communicated at 120, the call control element 54 in the destination gateway system 16 sends a BICC ACM message (at 122) over the ATM network 12 to the call control element 52. Upon receipt of the BICC ACM message, the call control element 50 in the gateway system 14 sends an ISUP ACM message (at 124) to the originating switch 20.

When the called party picks up the telephone, in this case terminal 26 connected to the switch 18, the destination switch 18 terminates the ringing tone and transmits an ISUP answer message (ANM) (at 126) to the destination gateway system 16. In response, the call control element 54 in the gateway system 16 sends a bearer control message (at 128) to the bearer control element 56 to connect the bearer channel on the ATM side to the bearer channel on the TDM side in the destination gateway system 16. The call control element 54 also sends a BICC ANM message (at 130) to the originating gateway system 14. Upon receipt of the BICC ANM message, the call control element 50 in the gateway system 14 sends a bearer control message (at 132) to the bearer control element 52 to connect the bearer channel on the ATM side to the bearer channel on the TDM side in the originating gateway system 14. The call control element 50 also sends an ISUP ANM message to the originating switch 20. At this point, a media path is established (at 136) between the switches 20 and 18 through the gateways 14 and 16 and the router(s) in the ATM network 12 so that exchange of bearer traffic (e.g., audio, video, or other streaming data) can proceed between the terminals involved in the call session.

As illustrated, resource (bandwidth) consumption on the packet-based network 12 by bearer traffic on a circuit-switched network does not occur until a success indication for the call session that traverses both the circuit-switched network and the packet-based network 12 has been received. Thus, during the time period up to receipt of the ANM message at 126, resource on the packet-based network 12 remains available for other calls to increase the available bandwidth of the packet-based network.

Without a connection of the TDM and packet-based networks, the destination terminal is unable to supply a tone or announcement to the originating terminal, which may be desired in some applications. To overcome this, the bearer control module (52 or 56) can be connected to a local tone generator and/or announcement server associated with the circuit-switched network. The bearer control module (52 or 56) can thus send a signaling message to supply the tone or announcement at the originating terminal without an end-to-end voice connection already in place.

Figure 4:
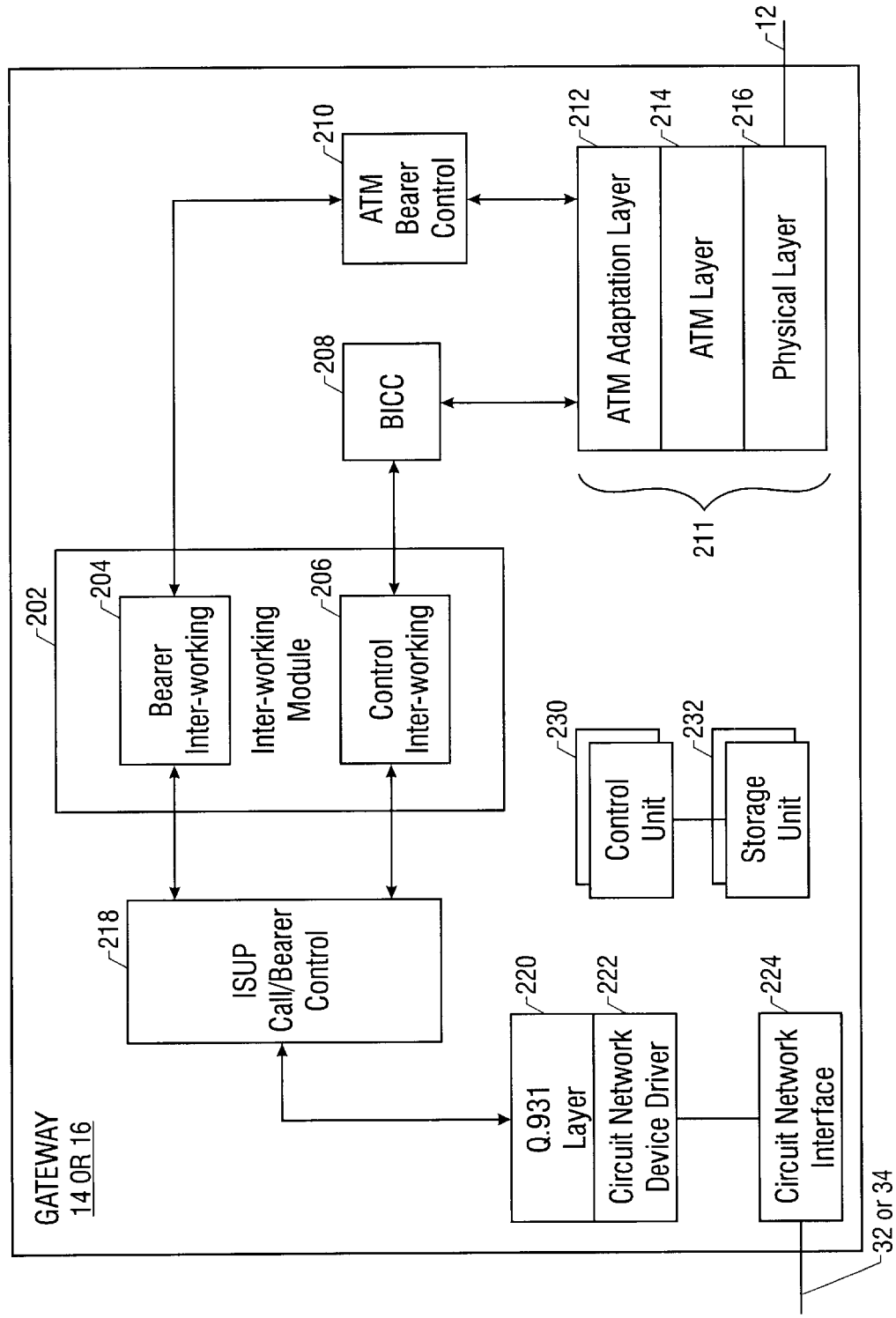
FIG. 4 is a block diagram of the first or second gateway of FIG. 3.

Referring to FIG. 4, components of the gateway system 14 or 16 are illustrated. The gateway system includes an ATM protocol stack 211 that includes a physical layer 216, an ATM layer 214, and an ATM adaptation layer (AAL) 212. The physical layer 216 includes a physical medium sublayer that specifies the physical and electro-optical interfaces of the transmission media on both the transmit and receive sides. The physical layer 216 also includes a transmission convergence sublayer that has components (hardware and/or software) for handling frame generation, frame adaptation, cell (or packet) delineation, header error control, and cell rate decoupling. The ATM layer 214 includes modules (software and/or hardware) for multiplexing of cells (or packets), selection of appropriate VPIs and VCIs, generation of headers, and flow control. The ATM adaptation layer (AAL) 212 performs segmentation and reassembly tasks. Segmentation is performed on the transmit side, where user data is segmented into payloads for insertion into cells. On the receive side, payload from cells are extracted and reassembled into the information stream as originally transmitted. The AAL 212 supports various types of traffic, including voice traffic that requires a continuous transmission of data, packet traffic that is bursty in nature, video traffic that is time sensitive, and low-priority data traffic that can be delayed in favor of other types of traffic.

BICC control signaling that are carried in ATM cells are communicated to a BICC module 208, while bearer traffic is provided to the ATM bearer control module 210. The BICC signaling and bearer traffic are communicated to an inter-working module 202 to translate the control and bearer signaling into a circuit-switched format. The inter-working module 202 includes a bearer inter-working submodule 204 and a control inter-working submodule 206. The control and bearer signaling is provided to an ISUP call/bearer control module 218 which handles the transmission and receipt of ISUP messages.

The gateway system also includes a circuit network interface 224 that is coupled to a circuit-switched network 32 or 34. In one embodiment, the circuit-switched network 32 or 34 can be an ISDN network. Alternatively, the network 32 or 34 can be another type of circuit-switched network, such as a T-carrier network. A circuit network device driver 222 is connected to the circuit network interface 224. In addition, if the network 32 or 34 is an ISDN network, a Q.931 layer 220 is provided for connection control (connection setup and teardown) on the ISDN network. With other types of networks, another network layer in place of the Q.931 layer 220 may be used.

Additionally, in further embodiments, if the packet-based data network 12 is an IP network, then the protocol stack 211 is replaced with an IP protocol stack. The IP protocol stack includes a physical layer, an IP layer, and a UDP (User Datagram Protocol) layer. UDP is described in RFC 768, entitled "User Datagram Protocol," dated August 1980. If the packet-based network 12 is an IP network, then the BICC and ATM bearer control modules 208 are replaced with other types of layers. Examples of other types of modules that may be included in the gateway system include modules that perform signaling according to the media gateway control (MEGACO) protocol, as described in Internet draft, entitled "MEGACO Protocol," dated April 2000. The MEGACO protocol is also referred to as the H.248 protocol. Alternatively, the gateway system can include modules for performing Session Initiation Protocol (SIP) or H.323 call signaling. The H.323 Recommendation is provided by the ITU, and describes terminals, equipment, and services for multimedia communications over data networks. SIP is described in RFC 2543, entitled "SIP: Session Initiation Protocol," dated August 1999. SIP may be used to initiate call sessions as well as to invite members to a session that may have been advertised by some other mechanism, such as electronic mail, news groups, web pages, and other mechanisms. SIP and H.323 are used for call establishment and release. Other protocols are used for communication of voice and other types of data, such as the Real-Time Transport protocol (RTP), as described in RFC 1889, for transporting real-time data and providing quality of service (QoS) feedback; and the Real-Time Streaming Protocol (RTSP), as described in RFC 2326, for controlling delivery of streaming media.

The gateway system further includes one or more control units 230 on which various software modules or routines are executable. One or more storage units 232 are accessible by the control units 230 to store data and instructions.

Figure 5:
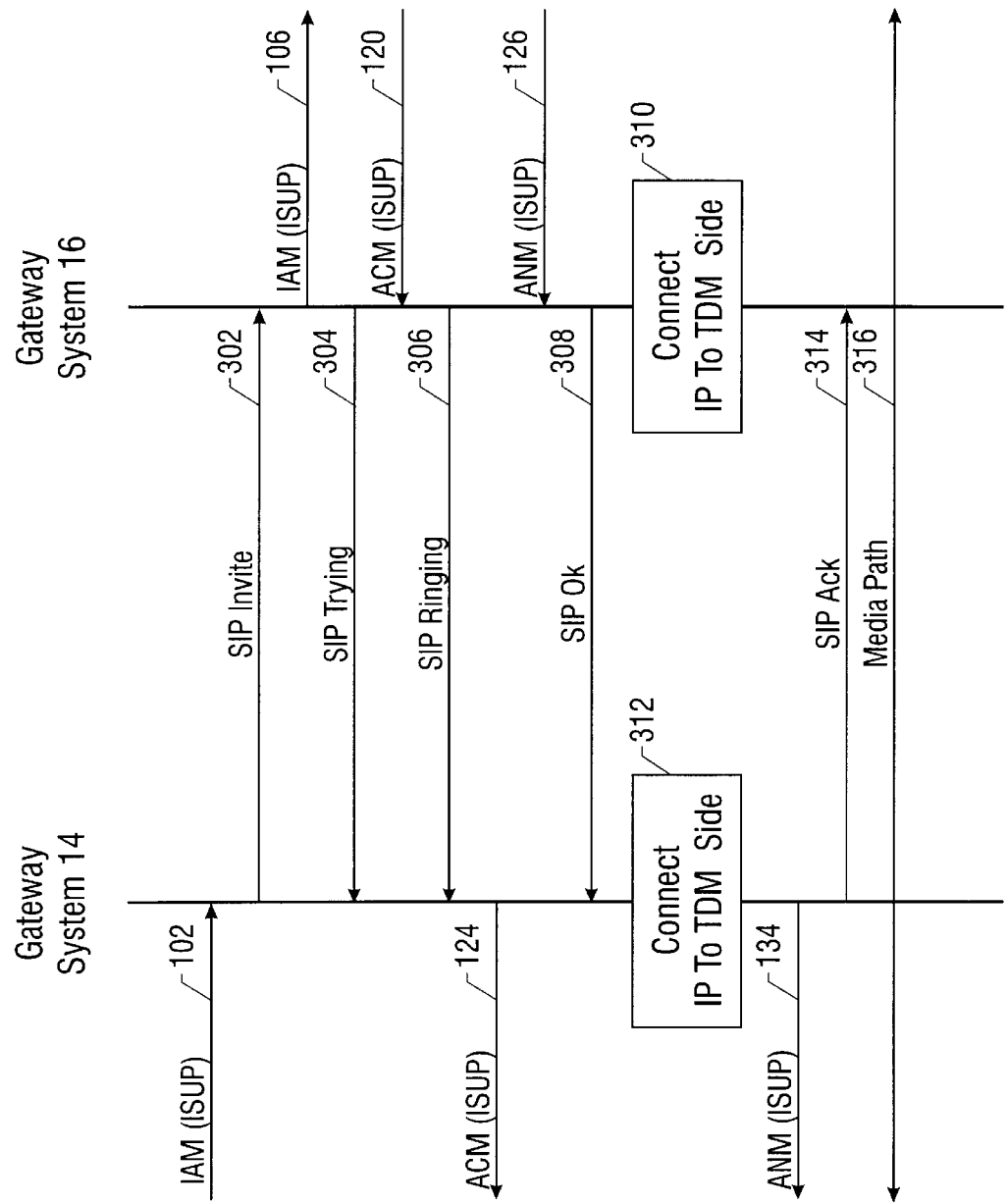
FIG. 5 is a message flow diagram of signaling to establish a call session that involves a first gateway and a second gateway coupled by a packet-based network, the signaling including Session Initiation Protocol (SIP) messaging and signaling over circuit-switched networks.

Referring to FIG. 5, if the BICC signaling is replaced with SIP signaling, then the exchange of messaging between the originating and destination gateway systems will change. In FIG. 5, the messages on the circuit-switched networks that remain the same as the messages in FIG. 3 are assigned the same reference numerals. In FIG. 5, instead of BICC messages between the gateway systems 14 and 16, SIP messages are used instead for establishing a call on the packet-based network 12. In response to the ISUP IAM message (at 102) from the originating switch 20, the originating gateway system 14 sends a SIP Invite request (at 302) to indicate that the receiving node (destination gateway system 16) is being invited to participate in a communications session. The destination gateway system 16 sends the ISUP IAM message (at 106) to the destination switch 106 in response to the SIP Invite message. The destination gateway system 16 also returns a SIP Trying response (at 304) to indicate that the called entity has located a possible location where the target has registered recently and is trying to alert the target. The destination switch 18 communicates an ISUP ACM message (at 120) to indicate that the destination switch 18 is serving the called party and that the line is available for ringing. The destination gateway system 16 then sends a SIP Ringing response (at 306) to the originating gateway system 14 to indicate that the destination gateway system 16 has located a possible location that the called party has registered at and is trying to alert the called party. In response, the originating gateway system 14 sends an ISUP ACM message (at 124) to the originating switch 20.

When the called party answers the call, the destination switch 18 sends an ISUP ANM message (at 126) to the destination gateway system 16. In response, the destination gateway system 16 returns a SIP OK response (at 308) to the originating gateway system 14 to indicate that the Invite has been successfully answered. The destination gateway system 16 at this point also connects (at 310) the IP side to the TDM side, which connects the bearer channels on the IP and TDM networks for the call session. Upon receiving the OK response, the originating gateway system 14 also connects (at 312) the IP side to the TDM side to connect the bearer channels on the IP and TDM networks. The originating gateway system 14 also sends a SIP ACK request (at 314) back to the destination node as well as send an ISUP ANM message (at 134) to the originating switch 20. A media path 316 is established after this.

The various software layers, routines, or modules discussed herein may be executable on control units in corresponding network elements, such as the gateway system 14 or 16. Instructions of such software layers, routines, or modules may be stored on one or more storage devices in the various network elements. A control unit may include a microprocessor, a microcontroller, a processor card (including one or more microprocessors or microcontrollers), or other control or computing devices. As used here, a "controller" refers to hardware or software components or a combination of both.

The storage devices may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs), and flash memories; magnetic disks such as fixed, floppy and removable disks; other magnetic media including tape; and optical media such as compact discs (CDs) or digital video discs (DVDs). Instructions that make up the various software routines or programs in various network elements stored in respective storage units when executed by a respective control unit cause the corresponding network element to perform programmed acts.

The instructions of the software routines or programs may be loaded or transported into the network element in one of many different ways. For example, code segments including instructions stored on floppy disks, CD or DVD media, a hard disk, or transported through a network interface card, modem, or other interface device may be loaded into the network element and executed as corresponding software layers, routines, or modules. In the loading or transport process, data signals that are embodied in carrier waves (transmitted over telephone lines, network lines, wireless links, cables, and the like) may communicate the code segments, including instructions, to the network node or entity. Such carrier waves may be in the form of electrical, optical, acoustical, electromagnetic, or other types of signals.

While the invention has been disclosed with respect to a limited number of embodiments, those skilled in the art will appreciate numerous modifications and variations therefrom. It is intended that the appended claims cover all such modifications and variations as fall within the true spirit and scope of the invention.

What is claimed is:

1. A method of establishing a call session over a first network of a first type and a second network of a second type, comprising:
    receiving a call request over the first network;
    establishing a call over the second network; and
    waiting for an answer message of the call over the second network before connecting the first network to the second network for communication of bearer traffic between the first and second networks in the call session to delay consumption of a resource on the second network.

2. The method of claim 1, wherein receiving the call request comprises receiving the call request over a circuit-switched network.

3. The method of claim 2, wherein establishing the call over the second network comprises establishing the call over a packet-based network.

4. The method of claim 1, wherein establishing the call over the second network comprises establishing the call over an Asynchronous Transfer Mode network.

5. The method of claim 1, wherein establishing the call over the second network comprises establishing the call over an Internet Protocol network.

6. The method of claim 1, wherein waiting for the answer message comprises waiting for an indication that a destination terminal has accepted the call request.

7. The method of claim 1, wherein receiving the call request comprises receiving an ISUP IAM message.

8. The method of claim 1, wherein establishing the call comprises sending a BICC IAM message.

9. The method of claim 1, wherein waiting for the answer message comprises waiting for an ANM message.

10. The method of claim 9, wherein waiting for the ANM message comprises waiting for a BICC ANM message.

11. The method of claim 1, wherein establishing the call comprises sending a SIP message to establish the call.

12. The method of claim 1, wherein receiving the call request is performed at a first system between the first network and the second network, the method further comprising forwarding the call request to a third network.

13. The method of claim 12, wherein receiving the call request comprises receiving an ISUP IAM message and forwarding the call request comprises forwarding an ISUP IAM message.

14. The method of claim 13, wherein establishing the call comprises sending a BICC IAM message over the second network to a second system between the second network and the third network.

15. The method of claim 12, further comprising waiting for a predetermined message communicated over the second network to establish a bearer channel in the second network.

16. The method of claim 12, wherein waiting for the answer message comprises waiting for an answer message from the third network, the method further comprising:
    connecting, in a second system, the second network to the third network to communicate bearer traffic; and connecting, in the first system, the second network and the first network to communicate bearer traffic.

17. An apparatus for use in a communications network having a circuit-switched network and a packet-based network, comprising:
   a first interface to the circuit-switched network;
   a second interface to the packet-based network; and
   a controller to receive a call request from a device on the circuit-switched network and to issue a request to establish a call on the packet-based network, the controller further to delay connecting the circuit-switched network to the packet-based network for communicating bearer traffic until an answer message of the call on the packet-based network is received.

18. The apparatus of claim 17, wherein the circuit-switched network comprises a time-division multiplex network.

19. The apparatus of claim 18, wherein the packet-based network comprises one of an Asynchronous Transfer Mode network and an Internet Protocol network.

20. The apparatus of claim 17, wherein the answer message comprises an indication that the call request has been answered.

21. The apparatus of claim 20, wherein the answer message comprises an ANM message.

22. The apparatus of claim 21, wherein the answer message comprises a BICC ANM message.

23. The apparatus of claim 20, wherein the answer message comprises a SIP OK message.

24. The apparatus of claim 17, the controller to issue a request to establish a call with a terminal coupled to a second circuit-switched network the circuit-switched network coupled through a gateway to the packet-based network.

25. The apparatus of claim 24, wherein the answer message comprises a message indicating the terminal has answered the request.

26. The apparatus of claim 24, wherein each of the first and second circuit-switched networks comprises a time-division multiplex circuit-switched network.

27. An article comprising one or more storage media containing instructions that when executed cause a system to:
   receive a first call request over a first type network;
   send a second call request over a second type network; and
   delay establishing a bearer traffic connection between the first type network and the second type network until after an answer message has been received in response to the second call request.

28. The article of claim 27, wherein the instructions when executed cause the system to receive the first call request over a time-division multiplex circuit-switched network.

29. The article of claim 28, wherein the instructions when executed cause the system to receive the first call request including an ISUP IAM message.

30. The article of claim 27, wherein the instructions when executed cause the system to send the second call request over a packet-based network.

31. The article of claim 30, wherein the instructions when executed cause the system to send the second call request over a packet-based network selected from the group consisting of an Asynchronous Transfer Mode network and an Internet Protocol network.

32. A data signal embodied in a carrier wave and comprising instructions that when executed causes a system to:
   in response to a first call request on a circuit-switched network, send a second call request on a packet-based network; and
   connect the circuit-switched network to the packet-based network for communicating bearer traffic after the second call request is successfully answered with an answer message.

33. The method of claim 1, wherein the first network is not connected to the second network for communication of bearer traffic until after receiving the answer message.

34. The method of claim 33, further comprising a ring generator connected to the first network transmitting a ring indicator over the first network to an originating terminal while the first network and second network are not connected for communicating bearer traffic.

35. The method of claim 33, further comprising an announcement server connected to the first network transmitting an announcement over the first network to an originating terminal while the first network and second network are not connected for communicating bearer traffic.

36. The apparatus of claim 17, wherein the controller is adapted to not connect the circuit-switched network to the packet-based network for communicating bearer traffic until the answer message has been received.

37. The apparatus of claim 36, further comprising a ring generator to transmit a ring indication over the circuit-switched network to the device while the circuit-switched network and the packet-based network are not connected.

38. The apparatus of claim 36, further comprising an announcement server to transmit an announcement over the circuit-switched network to the device while the circuit-switched network and the packet-based network are not connected.

39. The article of claim 27, wherein the bearer traffic connection between the first type network and second type network is not established until after the answer message has been received.

40. The article of claim 39, wherein receiving the first call request comprises receiving the first call request from an originating device, and wherein the instructions when executed cause the system to send a ring indication locally generated by the system over the first type network to the originating device while the bearer traffic connection is not established.

41. The article of claim 39, wherein receiving the first call request comprises receiving the first call request from an originating device, and wherein the instructions when executed cause the system to send a announcement locally generated by the system over the first type network to the originating device while the bearer traffic connection is not established.

42. The data signal of claim 32, wherein the circuit-switched network and packet-based network are not connected for communicating bearer traffic until after the second call request has been successfully answered with an answer message.

* * * * *